Patented Aug. 21, 1951

2,564,761

UNITED STATES PATENT OFFICE 2,564,761

PROCESS FOR MAKING BRANCHED-CHAIN ALKOXYACETALS

Raymond I. Hoaglin, South Charleston, W. Va., and Samuel F. Clark, Oxford, Miss., assignors, by mesne assignments, to Union Carbide and Carbon Corporation, a corporation of New York No Drawing. Application June 29, 1948, Serial No. 35,968

5 Claims. (Cl. 260—615)

The present invention relates to a process for making alkoxyacetals.

We have found that ethers of alpha,beta-unsaturated alcohols containing at least three carbon atoms react with dialkyl acetals of aldehydes by addition across one of the ether linkages of the acetal. This ether linkage then breaks to give an alkoxyacetal having a branched-chain carbon skeleton. This reaction may be represented as follows:

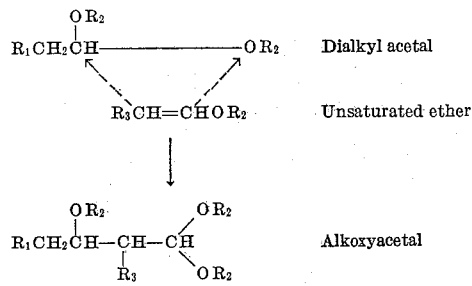

where $R_1$ is hydrogen or an alkyl, aryl or aralkyl radical, and $R_2$ and $R_3$ are alkyl radicals, such as methyl, ethyl, propyl, butyl, amyl, hexyl, heptyl or octyl radicals.

In an experiment to demonstrate the addition reaction of this invention, diethyl acetal was added to 1-butenyl ethyl ether according to the following reaction:

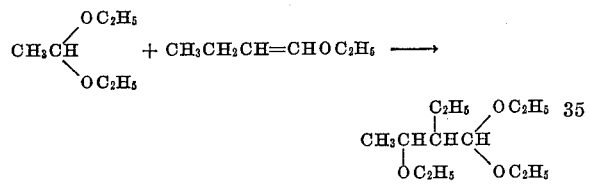

The alkoxyacetal formed according to the reaction was simultaneously hydrolyzed and de-ethanolated to form an unsaturated aldehyde. This aldehyde was identified as 2-ethylcrotonaldehyde, proving that the alkoxyacetal formed was 1,1,3-triethoxy-2-ethylbutane. This compound could not have been formed if the 1-carbon atom of the unsaturated ether had added to the 2-carbon atom of acetal.

The addition reactions of this invention are preferably carried out at temperatures of 25° to 75° C. in the presence of a boron trifluoride catalyst. Our preferred catalyst is the complex compound of boron trifluoride and diethyl ether. The amount of the catalyst may be between 0.01 and 0.5% of the reactants. The reaction may be carried out by simple mixing of the reactants accompanied by external cooling. The temperature may also be controlled by slow addition of the unsaturated ether to the dialkyl acetal accompanied by vigorous stirring. After completion of the reaction, the catalyst is neutralized with an alkaline reagent, such as sodium hydroxide, sodium carbonate, or sodium bicarbonate. The mixture is then distilled to recover the unchanged dialkyl acetals, and to isolate the higher boiling alkoxyacetals.

The alkoxyacetals are valuable as solvents and plasticizers and as chemical intermediates. The alkoxyacetals are readily converted to unsaturated aldehydes which may be reduced to saturated alcohols. The alkoxyacetals may also be hydrolyzed to alkoxyaldehydes which may be reduced or oxidized to the corresponding alkoxyalcohols or alkoxyacids. Hyrogenolysis of the acetal group of the alkoxyacetal may also be carried out, in which event alkyl ethers of polyhydric alcohols are obtained. Thus, the reaction of this invention is a very valuable tool for the industrial organic chemist in building up higher molecular weight compounds starting with simple, readily available compounds. In industrial practice, the initial raw material may be any of the cheap, readily available alcohols, such as ethanol and butanol. The alcohols may be oxidized to aldehydes, and the dialkyl acetals may be formed from the alcohols and the aldehydes. The alpha,beta-unsaturated ethers are readily formed by passing the dialkyl acetals over appropriate catalysts.

The following examples will illustrate the preparation of various alkoxyacetals:

*Example 1.—The reaction of diethyl acetal and 1-butenyl ethyl ether*

A mixture of 1062 grams (9 moles) of diethyl acetal and 1 cc. of a diethyl ether solution of boron trifluoride-diethyl ether complex (35% boron trifluoride-approximately 0.04% $BF_3$ based on the weight of the acetal) was stirred and warmed to 47.5° C. 1-butenyl ethyl ether (300 grams, 3 moles) was added from a dropping funnel in a period of 10 minutes. The reaction was essentially complete within 20 minutes after all the unsaturated ether was added. The mixture was stirred an additional two hours and then the catalyst was neutralized by agitation with 5 grams of sodium carbonate. After recovering the unreacted diethyl acetal by vacuum distillation, a product identified as 1,1,3-triethoxy-2-ethylbutane was obtained in 48.1% yield, based on the 1-butenyl ethyl ether charged. 1,1,3-triethoxy- 2-ethylbutane has a boiling point of about 76° C. (5 mm. Hg), sp. gr. (20/20° C.) 0.881 and refractive index $N_D^{20}$, 1.4172. No higher boiling ethoxyacetals were isolated as pure compounds.

*Example 2.—The reaction of diethyl acetal and 1-propenyl ethyl ether*

A mixture of 3010 grams (25.5 moles) of diethyl acetal and 3.4 cc. of a diethyl ether solution of boron trifluoride-diethyl ether complex (40% boron trifluoride 0.05% of boron trifluoride, $BF_3$, based on the acetal) was stirred and warmed to 42.5° C. To this mixture was added with stirring 732 grams (8.5 moles) of 1-propenyl ethyl ether. A temperature of 41 to 43.5° C. was maintained by regulation of the rate of addition of the unsaturated ether and by cooling the reaction vessel. The addition of 1-propenyl ethyl ether required one hour, after which the product was agitated an additional hour. The catalyst was neutralized by agitation with 23.5 grams of anhydrous, powdered sodium carbonate. After stirring about 4 hours the product was filtered to remove excess sodium carbonate and the salts formed in the neutralization. The mixture was distilled under vacuum in the presence of a small amount of fresh sodium carbonate to recover unreacted diethyl acetal and the product, 1,1,3-triethoxy-2-methylbutane. The yield of this new alkoxyacetal was 71%, based on 1-propenyl ethyl ether.

1,1,3-triethoxy-2-methylbutane has the following approximate physical properties:

B. P.=69° C. at 5 mm. Hg
Sp. Gr.=0.881 at 20/20° C.
Refractive Index, $N_D^{20}$=1.4116

*Example 3.—The reaction of 1,1-diethoxy-2-ethylbutane and 1-butenyl ethyl ether*

A mixture of 3080 grams (17.7 moles) of 1,1-diethoxy-2-ethylbutane and 4.1 cc. of a diethyl ether solution of boron trifluoride-diethyl ether complex (40% boron trifluoride 0.06% of boron trifluoride based on the acetal) was stirred while being warmed to 44° C. 1-butenyl ethyl ether (591 grams, 5.9 moles) was added from a dropping funnel during a period of 40 minutes. The reaction temperature was maintained between 42 and 46° C. by slight cooling of the reaction flask. The product was agitated for one hour, after which time 29 grams of sodium carbonate was added to neutralize the catalyst. The mixture was stirred 4 hours and then filtered to remove excess sodium carbonate and the salts formed in the neutralization. The filtrate was distilled to recover unreacted 1,1-diethoxy-2-ethylbutane and the product, 1,1,3-triethoxy-2,4-diethylhexane. The yield of this new ethoxyacetal was 54 per cent, based on 1-butenyl ethyl ether.

1,1,3-triethoxy-2,4-diethylhexane has the following approximate physical properties:

B. P.=81–84° C. at 1 mm. Hg
Sp. Gr.=0.882 at 20/20° C.
Refractive Index, $N_D^{20}$=1.4306

This application is a continuation-in-part of our copending application Serial No. 706,052, filed October 26, 1946.

What is claimed is:

1. Substituted alkoxyacetals of the formula

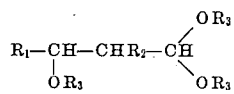

where $R_1$, $R_2$ and $R_3$ are alkyl radicals.

2. Substituted ethoxyacetals of the formula

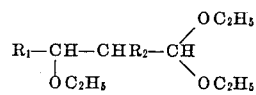

where $R_1$ and $R_2$ are alkyl radicals.

3. 1,1,3-triethoxy-2-ethylbutane.
4. 1,1,3-triethoxy-2-methylbutane.
5. 1,1,3-triethoxy-2,4-diethylhexane.

RAYMOND I. HOAGLIN.
SAMUEL F. CLARK.

REFERENCES CITED

The following references are of record in the file of this patent:

UNITED STATES PATENTS

| Number | Name | Date |
|---|---|---|
| 2,165,962 | Cunradi et al. | July 11, 1939 |
| 2,487,525 | Copenhaver | Nov. 8, 1949 |